United States Patent [19]

Weaver

[11] 3,944,051

[45] Mar. 16, 1976

[54] AUTOMATIC PACKAGE SELECTOR

[75] Inventor: George R. Weaver, Maple Shade, N.J.

[73] Assignee: Campbell Soup Company, Camden, N.J.

[22] Filed: Sept. 13, 1974

[21] Appl. No.: 505,779

[52] U.S. Cl. .......... 198/40; 198/32

[51] Int. Cl.² .......... B65G 43/00

[58] Field of Search .......... 198/40, 31, 32, 39

[56] References Cited

UNITED STATES PATENTS

| | | | |
|---|---|---|---|
| 3,339,700 | 9/1967 | Wells | 198/32 |
| 3,547,251 | 12/1970 | Mernoe | 198/40 |

*Primary Examiner*—James B. Marbert

*Attorney, Agent, or Firm*—John W. Logan

[57] ABSTRACT

Apparatus is disclosed for selecting at random one out of any predetermined number of articles passing along a conveyor line for the purpose of removing that selected article from the conveyor line for inspection. The apparatus consists of two separate repeating counters both of which are set to repeat their count and emit a signal upon the completion of a count equal to the aforesaid predetermined number of articles. An article sensor adjacent the conveyor senses each article passing along the conveyor and transmits an impulse to the first counter. A high frequency oscillator, preferably producing impulses at least ten to the fifth power times faster than the article sensor, normally transmits impulses to the second counter. Switching mechanism is provided through which the impulses from both the article sensor and the oscillator may pass. When the first counter reaches its preselected count the switching mechanism is actuated to interrupt the transmittal of impulses from the high frequency oscillator to the second counter and substitute for those high frequency impulses the impulses from the package sensor. When the total count on the second counter reaches the aforesaid predetermined number after the initial actuation of the switching mechanism, the switching mechanism is again actuated to return to its original condition and the article which caused completion of the count on the second counter is ejected from the conveyor for inspection.

11 Claims, 2 Drawing Figures

AUTOMATIC PACKAGE SELECTOR

Figure 1:
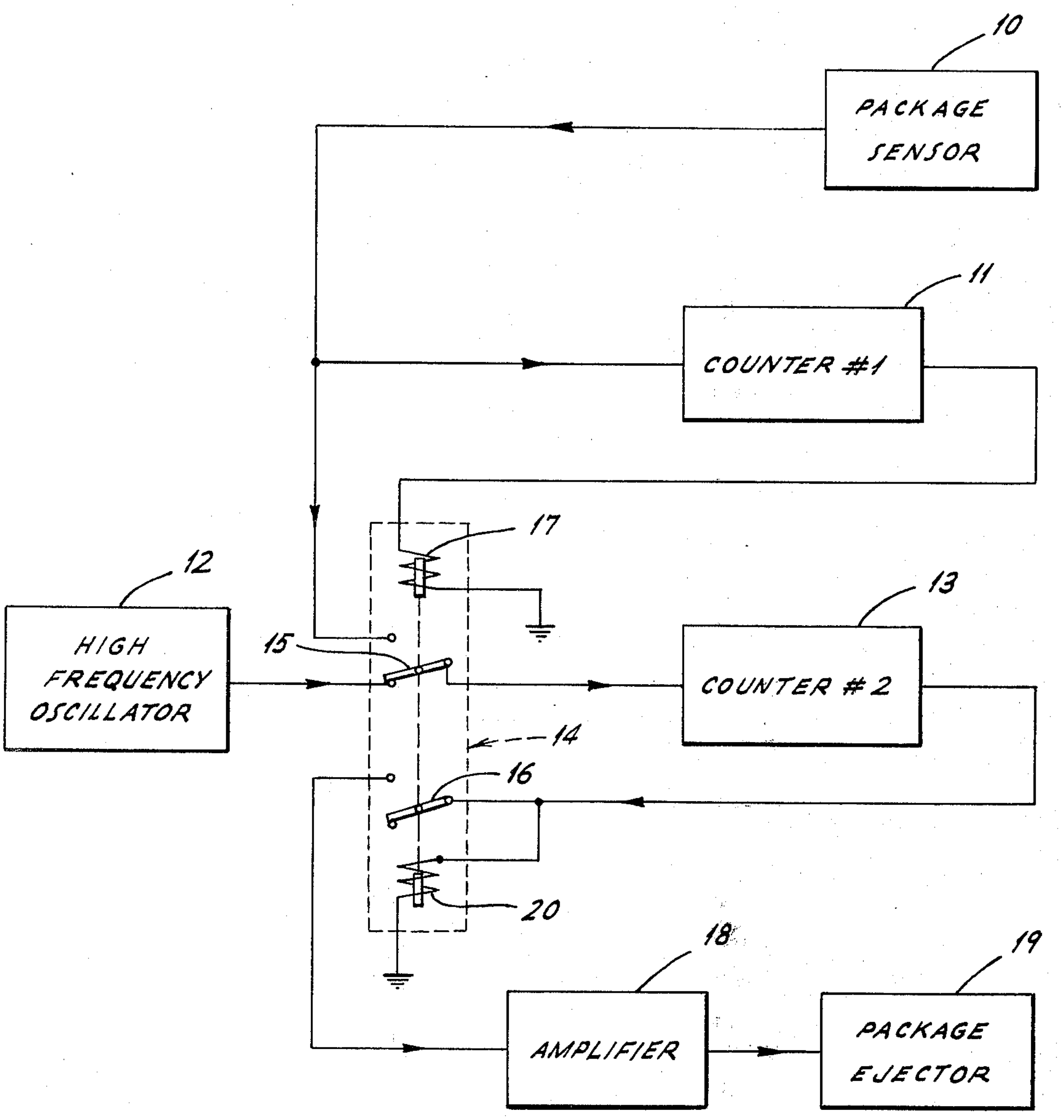

The present invention relates to new and useful improvements in means for randomly selecting any desired predetermined percentage of articles from a group of articles passing a selection station and more particularly to means for selecting at random one article out of each predetermined number of articles passing along a conveyor line to permit a random selection of articles spread out over entire production run and the setting aside of those selected articles for inspection or for test purposes.

In many manufacturing procedures it is necessary, in addition to the normal inspection during the course of producing and packing a product, to select a portion of the finished articles either for final inspection or to hold for test or quality control purposes. The selection of these articles for inspection or testing should be spread over the entire production run but should also be selected at random so that no predetermined pattern is established in the selection of the articles. A selection at random of the entire production run could result in the selection of an inordinate quantity of the articles from a particular short segment of the production run which would not give a true picture of the quality or characteristics of the entire group of product. Similarly, a selection of articles at uniformly spaced intervals during the production run could establish a pattern that could match a pattern in production of the articles so that a true representation of the finished product is not obtained. This type of random selection is particularly necessary in the food processing industry where a percentage of the articles produced must be selected for quality control analysis. Since most filling and packaging systems operate on a fixed cycle basis, a uniformly spaced selection of samples could result in obtaining successive samples which were filled by the same station of a filling machine or closed by the same station of a closing or sealing machine. This could conceal a problem which might exist at some other station of the filling or closing apparatus. Also a random selection which is not spaced generally uniformly over the entire production run could result in a lack of samples during a period of time when particular processing equipment might not have been operating properly. Accordingly it is most desirable to select at random a particular percentage of each of successive groups of articles over the entire production run to obtain an accurate picture of the quality of the entire product.

With the foregoing in mind, a primary object of the present invention is to provide novel apparatus for randomly selecting articles for testing from a continuous source of production in which the random selection of articles is spread evenly across the entire production run.

Another object of the present invention is to provide a novel apparatus for randomly selecting articles which can be preset to select at random any desired percentage of the articles.

A further object of the present invention is to provide novel apparatus which will sense articles passing along a conveyor and select at random one out of every predetermined number of such articles and eject the selected articles from the conveyor for later inspection or testing.

A still further object of the present invention is to provide a novel apparatus for randomly selecting articles from a continuous source of supply of articles, which apparatus may be manufactured easily and quickly and which is highly efficient and effective in operation and use.

Figure 2:
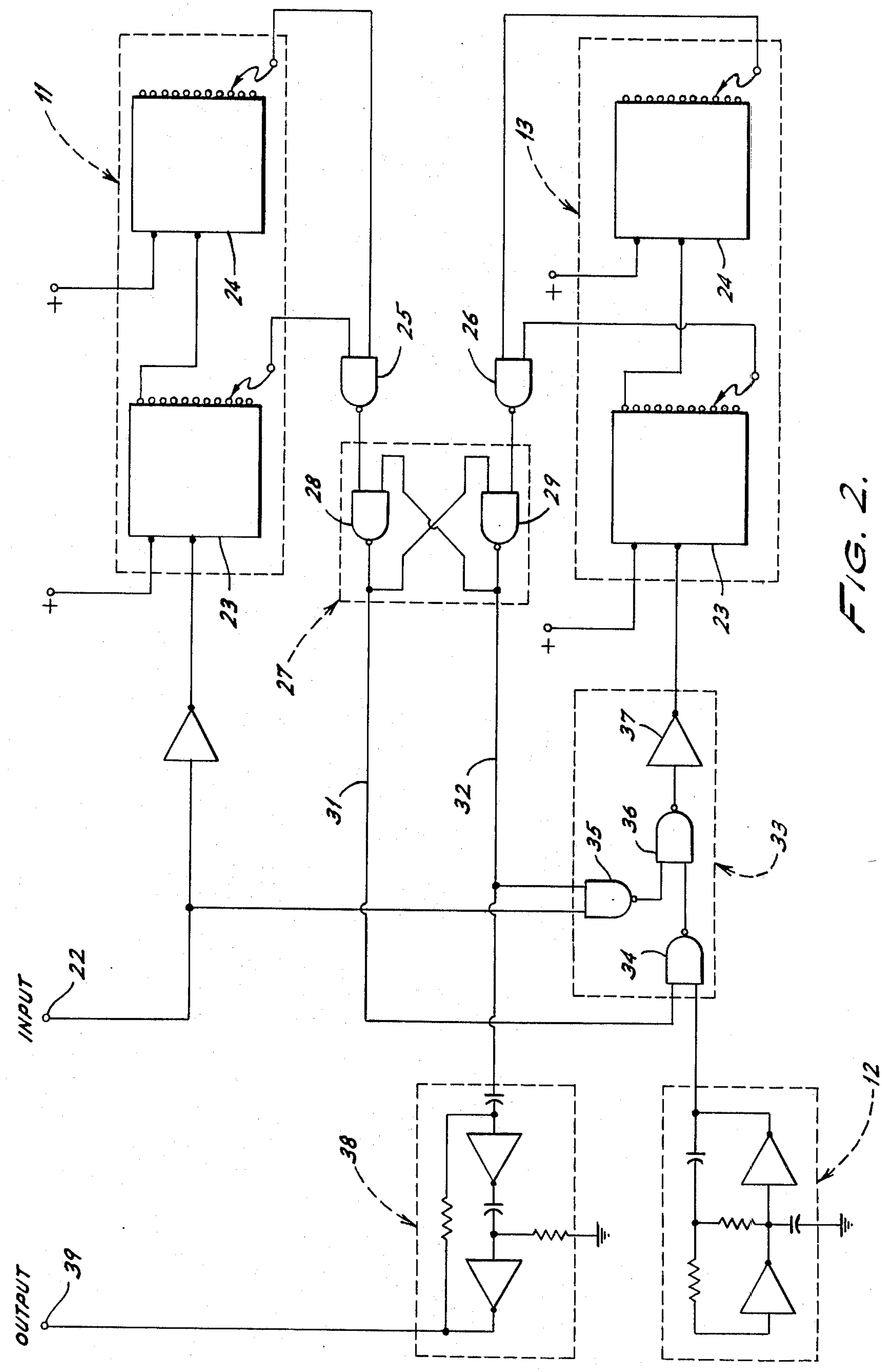

These and other objects of the present invention and the various features and details of the operation and construction thereof are hereinafter more fully set forth and described in conjunction with the accompanying drawing, in which:

FIG. 1 represents schematically the apparatus of the present invention for making a random selection of articles on a production line and causing removal of the selected article from the production line; and FIG. 2 is a circuit diagram showing one form of the apparatus of the present invention.

In accordance with the present invention, an automatic package selector is provided which will select at random a preset percentage of packages passing along a conveyor and eject those selected packages from the conveyor for further inspection or testing. This package selector is designed to select packages at random from the conveyor but to also spread the random selection uniformly over a complete production run. For example, assume it is desired to select one percent of an entire day's production from a continuously operating production line. In order to select the packages at random but to spread the random selection uniformly over the production line, the package selector of the present invention functions to select at random one package out of every 100 packages passing along this line. This will thus provide a random selection of packages spread evenly over the entire production run.

With reference to FIG. 1, articles are conveyed past a package sensor 10 which emits a signal each time an article passes the sensor. The sensor 10 may comprise for example, a normally open proximity switch which is closed each time an article article passes along the conveyor adjacent the proximity switch. The impulses from the package sensor 10 are transmitted to a first counter 11 which may be set to count to any desired number, emit a signal when it reaches its set count and then automatically reset itself and repeat the count.

The set count of the first counter 11, will be the reciprocal of the fraction of the packages which are to be selected from the group of packages for sampling or testing. If it is desired to select one package out of every one hundred packages, the first counter 11 will be set to count to one hundred and then repeat.

Simultaneously with the count from the package sensor 10 being transmitted to the first counter 11, a suitable source of high frequency signals such as a high frequency oscillator 12 transmits impulses to a second counter 13 through switching mechanism 14. The high frequency oscillator is preferably designed to transmit signals to the second counter at an extremely high rate, for example in the range of $10^5$ times than the rate of impulses from the package sensor. The second counter 13 is exactly the same as the first counter 11 and should be set to count to the same number as the first counter. In a manner similar to the first counter, the second counter will automatically reset itself and repeat its count when it reaches the set count and will also emit a signal when it reaches its preset count.

In accordance with the present invention, the switching mechanism 14 is provided which at the start of a cycle of operation is in the condition as shown in FIG. 1. In this condition, a first switch 15 is in its lowermost position completing a circuit from the high frequency oscillator 12 to the second counter 13. A second switch 16 is in its lowermost or open position, as shown. When the counter 11 reaches its full count and emits a signal, a relay 17 is energized which raises the switch 15 from its lower position to its uppermost position interrupting the circuit from the high frequency oscillator to the second counter and at the same time completing a circuit from the package sensor to the second counter so that the impulses from the package sensor 10 are transmitted to both the first and the second counter. Energizing the relay 17 will also cause the switch 16 to close a circuit from the second counter to the amplifier 18 which in turn will amplify the signal received by it and cause operation of a package ejector 19.

It should be understood at this time that completion of a count by the first counter 11 will interrupt the count of the second counter 13 of impulses from the high frequency oscillator and substitute on the second counter pulses from the package sensor 10. The second counter 13 has been counting at an extremely high rate, for example in the range of $10^5$ times the rate of the first counter 11. Thus, the second counter will be interrupted at some random time during the course of its count, perhaps on the first count, perhaps on the last count, or at some count intermediate the first and last count.

After the relay 17 is energized, the second counter 13 continues its count, counting impulses from the package sensor 10 instead of impulses from the high frequency oscillator 12. When the second counter 13 completes its count, it emits an impulse which passes through the switch 16 to the amplifier 18 to actuate the package ejector and eject from the conveyor that package which causes the second counter to complete its count. At the same time, the impulse transmitted from the second counter energizes the relay 20 to move the switches 15 and 16 back to their original position at which time the second counter starts again to recieve and count impulses from the high frequency oscillator. While the second counter had been receiving impulses from the package sensor the first counter 11 had also been receiving the same impulses and had restarted its count after it caused energization of the relay 17. Thus, at this time the first counter 11 will be partly through its present count and when it reaches its preset count it will again energize the relay 17 to cause the position of the switches 15 and 16 to be moved as previously described. Thus it can be seen that at some random time during each complete cycle of count of the first counter, the second counter will be caused to emit a signal to eject a package from the conveyor so that the system will select packages at random from a continuous line of packages passing by a sensing station with the random selection of the packages being spread uniformly over a preselected group of packages.

FIG. 2 illustrates schematically one circuit for accomplishing the random selection of packages in accordance with the present invention. The input signal from the package sensor is provided at an input terminal 22. The high frequency signal is provided by a high frequency oscillator 12 which may be in the form as shown in the drawings and preferably is designed to provide a series of high frequency pulses at a rate in the range of $10^5$ times faster than the input pulses from the package sensor. The first and second counters are shown at 11 and 13 with both counters being exactly the same and set to count to the same number. In this instance each counter consists of a pair of decade counters 23 and 24 with the decade counter 23 being for units and the decade counter 24 being for tens. Additional decade counters may be added if it is desired to provide a less frequent selection of packages than in the example previously given. The unit decade counter 23 is advanced one count for every input signal from its input source and as it completes its count it automatically repeats itself and simultaneously produces a signal to directly clock the next succeeding decade counter 24 in the multidecade counting chain.

When each decade of the counter has completed their count, they produce a positive or high pulse which, from the counter 11 is transmitted to the NAND gate 25 and from the counter 13 is transmitted to the NAND gate 26. The NAND gates transmit pulses to the R/S flip-flop 27 which is made up of two NAND gates 28 and 29 whose outputs are cross-coupled as shown.

The R/S flip-flop 27 functions so that when it is in its set condition, the condition it is in after receiving an impulse from the first counter 11, it produces a positive signal at output 31 and a negative signal at output 32. When the flip-flop 27 is changed to its reset condition by receiving an impulse from the second counter 13, the output signals are reversed. When the first counter 11 completes its count the flip-flop 27 functions to provide a switching signal to a switching circuit 33 to interrupt the signal from the high frequency oscillator 12 to the second counter 13 and cause the signal from the package sensor at the input terminal 30 to be transmitted to the second counter 13. This switching circuit 33 comprises a combination of three NAND gates 34, 35 and 36 together with an inverter 37 which transmits the signal to the second counter.

When the switching circuit 33 and flip-flop 27 are in the condition transmitting impulses from the package sensor to the second counter 13 and the second counter 13 completes its count, it produces a signal which passes through the NAND gate 26 to the flip-flop, causing the flip-flop to transmit a signal to the switching circuit 33 to switch the count from the package sensor back to the high frequency oscillator and simultaneously causing the flip-flop 27 to produce a positive pulse at the output 32 which actuates the one-shot multi-vibrator 38. This one-shot multi-vibrator 38 may be in the form as shown in the drawings and operates to generate a specified output pulse for a predetermined change in input. The output pulse from the one-shot multi-vibrator 38 is then transmitted through the output terminal 39 to the aforementioned package ejector 19 which functions to eject from the conveyor line for later testing or inspecting that randomly selected package. At this time the circuitry is in the condition it was in at the start with the first counter 11 receiving impulses from the package sensor and the second counter 13 receiving and counting high frequency impulses from the high frequency oscillator 12.

From the foregoing, it may be seen that the present invention provides a novel apparatus and system for making a random selection of packages from a conveyor line with the random selection being spread uniformly over a period of time.

While particular embodiments of the invention have been illustrated and described herein, it is not intended to limit the invention to such and disclosure and changes and modifications may be incorporated and embodied therein within the scope of the following claims.

I claim:

1. Article selecting apparatus comprising: article sensing means to sense articles passing the sensing means and produce a signal as an article passes the sensing means, means to select at random one article out of every preselected number of articles passing the sensing means, and means to remove said selected article from the remaining articles passing the sensing means.

2. Apparatus in accordance with claim 1 including a first counter to receive the signals from said article sensing means, said first counter being set to count to a preselected number equal to said preselected number of articles and then to repeat its count, and said first counter operable to initiate operation of said random selecting means each time said first counter completes its count to said preselected number.

3. Apparatus in accordance with claim 2 in which the random selecting means includes a second counter set to count to said preselected number and then repeat its count, said second counter normally counting at a different rate of speed than said first counter, and means to interrupt the count of said second counter at said different rate of speed and cause said second counter to continue its count by counting signals from said article sensing means when said first counter counts to said preselected number.

4. Apparatus in accordance with claim 3 including signal producing means to create signals at a more rapid rate than said article sensing means, said second counter normally counting signals from said signal producing means.

5. Apparatus in accordance with claim 4 in which said signal producing means consists of a high frequency oscillator producing signals at a rate approximately $10^5$ times faster than said article sensing means.

6. Apparatus in accordance with claim 4 including switching means through which the signals from said article sensing means and said signal producing means pass.

7. Apparatus in accordance with claim 6 in which said switching means is actuatable between a first condition and a second condition said switching means in said first condition transmitting signals from said article sensing means to said first counter and transmitting signals from said signal producing means to said second counter and said switch means in said second condition transmitting signals from said article sensing means to both said first and second counters.

8. Apparatus in accordance with claim 7 in which said first and second counters are both operable to produce a signal when their count is completed, the signal from said first counter changing said switching means from said first condition to said second condition and the signal from said second counter changing said switching means from said second condition to said first condition.

9. Apparatus in accordance with claim 8 in which the signal from said second counter is transmitted to said means to remove said selected article to actuate the same simultaneously upon changing the condition of said switching means from said second condition to said first condition.

10. Apparatus in accordance with claim 1 in which the random selecting means includes a second counter, means to produce a source of signals at a substantially greater frequency than the frequency of the signals produced by said article sensing means, said second counter being set to count to a preselected number and then repeat its count, switching means operable in a first condition to connect said second counter to said means to produce a source of signals and in a second condition to interrupt said connection and connect said second counter to receive the signals from said article sensing means, and control means for said switching means to control the condition of said switching means.

11. Apparatus for randomly selecting one article out of each predetermined number of articles of a group of articles comprising: a first counter for said group of articles to count to said predetermined number and emit a signal when its count is complete and thereafter repeat said count, a second counter to count to said predetermined number and emit a signal when its count is complete and thereafter repeat said count, switching means actuated by said signals from said first and second counters, said switching means actuatable to a first condition upon receipt of said signal from said second counter and actuatable to a second condition upon receipt of said signal from said first counter, sensing means to sense said articles and transmit an impulse through said switching means for each article sensed, high frequency impulse transmitting means to transmit impulses through said switching means at a greatly higher rate than said sensing means, article selecting means to receive said signal from said second counter through said switching means, said switching means when in said first condition transmitting impulses from said sensing means to said first counter and transmitting impulses from said sensing means to said first counter and transmitting impulses from said high frequency impulse transmitting means to said second counter, and said switching means when in said second condition transmitting impulses from said sensing means to both said first and second counters and transmitting said signal from said second counter to said article selecting means.

* * * * *